United States Patent [19]
Wesolowicz et al.

[11] Patent Number: 5,793,034
[45] Date of Patent: Aug. 11, 1998

[54] TARGET DETECTION SYSTEM UTILIZING MULTIPLE OPTICAL CRITERIA

[75] Inventors: Karl G. Wesolowicz, Canton; David S. Dilworth, Ann Arbor, both of Mich.; Randall W. Zywicki, McKinney, Tex.; Keith A. More, Ann Arbor, Mich.; James P. Lehotsky, Chelsea, Mich.; Frederick G. Osterwisch, Ann Arbor, Mich.

[73] Assignee: Daedalus Enterprises, Inc., Ann Arbor, Mich.

[21] Appl. No.: 713,441

[22] Filed: Sep. 13, 1996

Related U.S. Application Data

[60] Provisional application No. 60/003,905 Sep. 18, 1995.

[51] Int. Cl.$^6$ ............................................. H01J 3/14
[52] U.S. Cl. ................... 250/216; 250/559.4; 356/152.3; 359/170
[58] Field of Search ........................ 250/216, 559.4, 250/221, 203.2, 203.6; 356/141.1, 141.2, 141.4, 375, 152.3; 359/169, 170, 518, 527

[56] References Cited

U.S. PATENT DOCUMENTS

| | | | |
|---|---|---|---|
| 3,839,638 | 10/1974 | Hughes | 250/302 |
| 3,839,639 | 10/1974 | Hughes | 250/302 |
| 3,885,246 | 5/1975 | Tung | 359/516 |
| 3,961,187 | 6/1976 | Barringer | 250/301 |
| 4,015,131 | 3/1977 | McDonough et al. | |
| 4,053,233 | 10/1977 | Bien et al. | 356/141 |
| 4,416,509 | 11/1983 | Milan | |
| 4,563,577 | 1/1986 | Schaller | 250/221 |
| 4,684,247 | 8/1987 | Hammill, III | 356/152 |
| 4,893,922 | 1/1990 | Eichweber | 356/1 |
| 4,963,752 | 10/1990 | Landis et al. | 250/459.1 |
| 4,996,430 | 2/1991 | Gupta | 250/339.11 |
| 5,114,227 | 5/1992 | Cleveland, Jr. | 356/152 |
| 5,208,641 | 5/1993 | Mocker et al. | 356/5 |
| 5,237,449 | 8/1993 | Nelson et al. | 359/532 |
| 5,280,270 | 1/1994 | Correa et al. | 340/471 |
| 5,471,218 | 11/1995 | Talbot et al. | 342/357 |
| 5,552,772 | 9/1996 | Janky et al. | 340/573 |
| 5,625,456 | 4/1997 | Lawandy | 250/559.4 |

OTHER PUBLICATIONS

W.L. Cabral, "LIDAR Techniques for Search and Rescue," *SPIE*, vol. 540, Southwest Conference on Optics, 1985, pp. 560–565, Jan. 1985.

*Primary Examiner*—Que Le
*Attorney, Agent, or Firm*— Gifford, Krass, Groh, Sprinkle, Patmore, Anderson & Citkowski

[57] ABSTRACT

A laser-based target detection system applicable for search-and-rescue type operations takes into account a plurality of optical attributes in the energy delivered to, and received from, a target-containing area so as to enhance effectiveness. In addition to analyzing the returned optical signature for sufficient energy reflected by a potential target at a primary laser wavelength, the system also senses the target's effect on a supplemental optical attribute, and only when sufficient amplitude at the primary wavelength is detected in conjunction with a substantial effect on the supplemental optical attribute is a valid target confirmed. In one embodiment, the supplemental optical attribute is amplitude at a wavelength other than the primary wavelength, with the system preferably looking for a high degree of attenuation at the non-primary wavelength. In an alternative embodiment, polarization is used as the supplemental optical attribute, with the system preferably looking for change of orientation in the return optical signature.

22 Claims, 4 Drawing Sheets

TARGET DETECTION SYSTEM UTILIZING MULTIPLE OPTICAL CRITERIA

REFERENCE TO RELATED APPLICATION

This application claims priority of U.S. provisional application Ser. No. 60/003,905, filed Sep. 18, 1995, the entire contents of which are incorporated herein by reference.

FIELD OF THE INVENTION

The present invention relates generally to optical target detection for search and rescue type operations and, more particularly, to a system wherein multiple characteristics of a return signal are analyzed in order to enhance target discrimination relative to background induced noise.

BACKGROUND OF THE INVENTION

There will always be a need for more efficient systems to locate human beings in distress, downed aircraft, crippled marine vessels, and so forth. Existing equipment for aiding search and rescue operations typically rely on "beacon" radio transmitters carried by aircraft, boats, etc. which are activated manually or automatically by sensors in event of an emergency. Search personnel are alerted to the event and guided to its location by the signal emitted from the transmitters. Such systems have proven less than perfect however, primarily due to a high false alarm rate resulting from unintentional enabling of the transmitters, as well as a high failure rate in catastrophic events. When these devices fail to operate properly, human visual search from aircraft is then usually resorted to.

To improve search and rescue operations, it is known to employ a scanning laser beam in conjunction with a particularized marker to enhance reflectivity. For example, in U.S. Pat. Nos. 3,839,638 and '639 to Hughes, a scanning laser beam is used in conjunction with a marker employing an organic dye to create visible or invisible fluorescence upon reaction with the laser energy. A fluorescence detection system, including a low-light-level television camera and a threshold device, provides an alarm when the chemical is detected.

It is also known to employ retroreflectors, which redirect incident light back toward its source, to enhance the intensity of a return optical signal. Various retroreflector designs are known in the art, and may take the form of isolated objects or optical elements embedded in flat surfaces, including tapes. Retroreflectors have also been employed in laser-based search and detection systems, as disclosed in U.S. Pat. No. 4,053,233 to Bien et al entitled RETROREFLECTORS. According to this reference, a continuous-wave laser, preferably emitting in the near-infrared light range, is used in conjunction with a retroreflector placed, for example, on a floating object out at sea, which returns the incident radiation back to the source for subsequent discrimination.

The use of retroreflection permits received light levels to be 2000 times or greater than that occurring from white paper, allowing for discrimination against most natural and man-made objects in the area. However, the materials used depend upon a large signal return from a broadband, highly reflective coating. As such, it is often the case that highly reflective (specular) objects may also return a strong "glint" reflection comparable to, or exceeding, that from the retroreflector. These objects typically have mirror-like reflections, and may occur from water, windshields, auto bumpers, soda pop cans, etc. Thus, even with the use of currently available retroreflectors, it is often a requirement that marked and glint objects be discriminated through visual identification. There remains an outstanding need, therefore, for a target identification system applicable to search-and-rescue operations which exhibits high reliability but with a low false alarm potential.

SUMMARY OF THE INVENTION

The present invention enhances reliability, probability-of-detection, and reduces false alarm rates in a target detection system by taking into account a plurality of optical attributes in the energy delivered to, and received from, a target-containing area. Broadly, one goal of the system is to properly identify targets while rejecting both diffuse and glint features which may be present in the search environment. Although diffuse reflectors will typically reflect less light than targets, enabling their existence to be distinguished by the strength of the return light, glint reflections are brighter than diffuse reflections, and cannot effectively be rejected on the basis of the strength of reflected light alone. Accordingly, in addition to analyzing the returned optical signature for sufficient energy reflected by a potential target at a primary laser wavelength, the system also senses the target's effect on a supplemental optical attribute, and only when sufficient amplitude at the primary wavelength is detected in conjunction with a substantial effect on the supplemental optical attribute is a target confirmed. In one embodiment, the supplemental optical attribute is amplitude at a wavelength other than the primary wavelength, with the system preferably looking for a high degree of attenuation at the non-primary wavelength. In an alternative embodiment, polarization is used as the supplemental optical attribute, with the system preferably looking for a change in the rotation of an elliptically polarized beam. Various other alternative optical attributes and combinations are also disclosed.

In terms of hardware, the invention includes a chassis containing electronic subsystems responsible for delivering optical radiation with the appropriate attributes to a target-containing area, and means for analyzing the optical signature returned by the target or other objects in a search area. This chassis may either be stationary or moved with respect to an area to be searched, as on-board an aircraft. To ensure the effectiveness of the system, the invention further includes a marker adapted for placement on a target to be located, the marker including means for receiving optical radiation from the chassis and reflecting the radiation at the primary wavelength back to the chassis with the secondary optical attribute being substantially altered. Retroreflection is preferably used to redirect energy at the primary wavelength back to the chassis, and in the multiple-wavelength embodiment of the invention, a dye, dielectric stack, or other suitable alternative is used in conjunction with the retroreflector to attenuate the non-primary wavelength.

A chassis integrating a comprehensive target detection system using the multiple-wavelength embodiment of the invention might therefore include the following components:

- a plurality of lasers operating at different frequencies;
- a combiner to merge the outputs of the lasers into a common search beam;
- means for directing the search beam into a target-containing area;
- collection optics to gather optical energy reflected by the target;

means to separate the optical energy reflected by the target into a plurality of outputs associated with each laser frequency;

a plurality of photodetectors, each receiving one of the outputs associated with each laser frequency and producing an electrical signal representative thereof; and signal processing and discrimination electronics connected to each photodetector are used to generate a valid target signal when the optical energy reflected by the target at each laser frequency pass a discrimination algorithm.

In addition, one or more of the lasers may be pulsed, and various scanning/imaging techniques may be used for beam delivery or detection. Optionally, a geo-location fixing system system (GPS) receiver may be employed, enabling the target to be geo-located when the criteria are met.

DETAILED DESCRIPTION OF THE PREFERRED EMBODIMENT

According to this invention, a laser-based illumination system and specially prepared marker materials are used cooperatively to provide target detection apparatus with a higher probability of detection and lower false alarm rate as compared to the prior-art approaches. In contrast to existing techniques, which utilize single laser scanning and retroreflective marker materials, the present invention analyzes multiple properties of the return signal to better distinguish a target signature from glint reflections and other spurious energy associated with background noise.

In a preferred embodiment, the invention realizes this enhanced discrimination by delivering a plurality of laser wavelengths to a uniquely tailored marker material so as to provide a higher reflection coefficient at one wavelength while significantly attenuating reflection at another wavelength. Detector electronics associated with the receiver aspect of the invention are used to analyze signal strength as a function of the wavelength, and only in the event of an appropriate reflection/attenuation profile will target detection be verified. In an alternative embodiment of the invention, a marker material which affects both reflection and polarization of a laser source is employed for subsequent analysis. In all cases, additional techniques may be used to enhance reliability, including multiple sampling of the same target in comparisons among the sampling to further enhance effectiveness.

In this detailed description, laser source and detector subsystems will first be described with respect to FIG. 1, emphasizing the multiple wavelength aspect of the invention. Alternative embodiments will then be described, which exploit additional optical properties such as polarization. Detection apparatus and specially prepared markers according to the invention will be described in detail, along with examples and results obtained using a representative embodiment.

Figure 1:
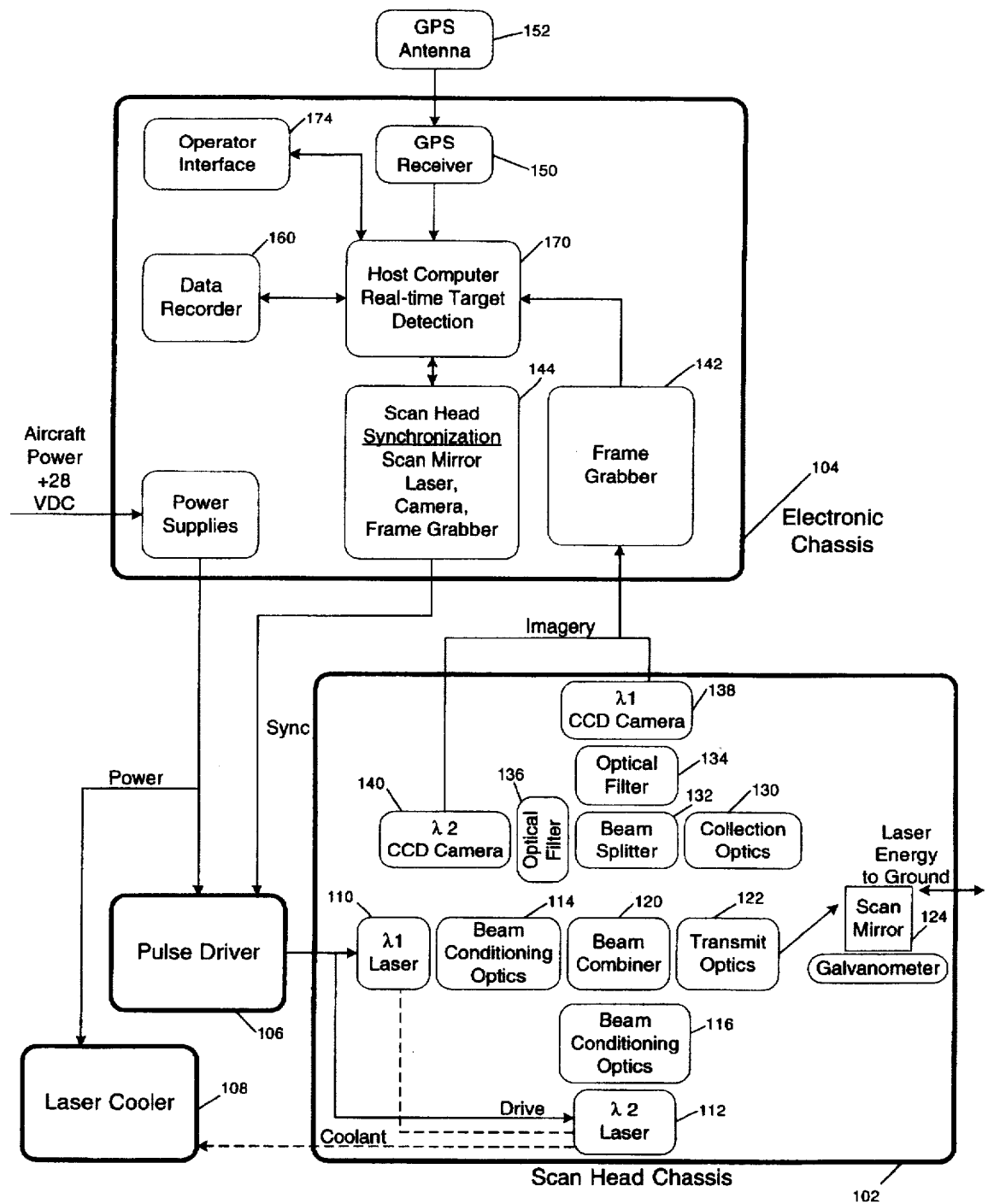
FIG. 1 is a block diagram of instrumentation according to the invention which may be used in an airborne application.
Figure 2:
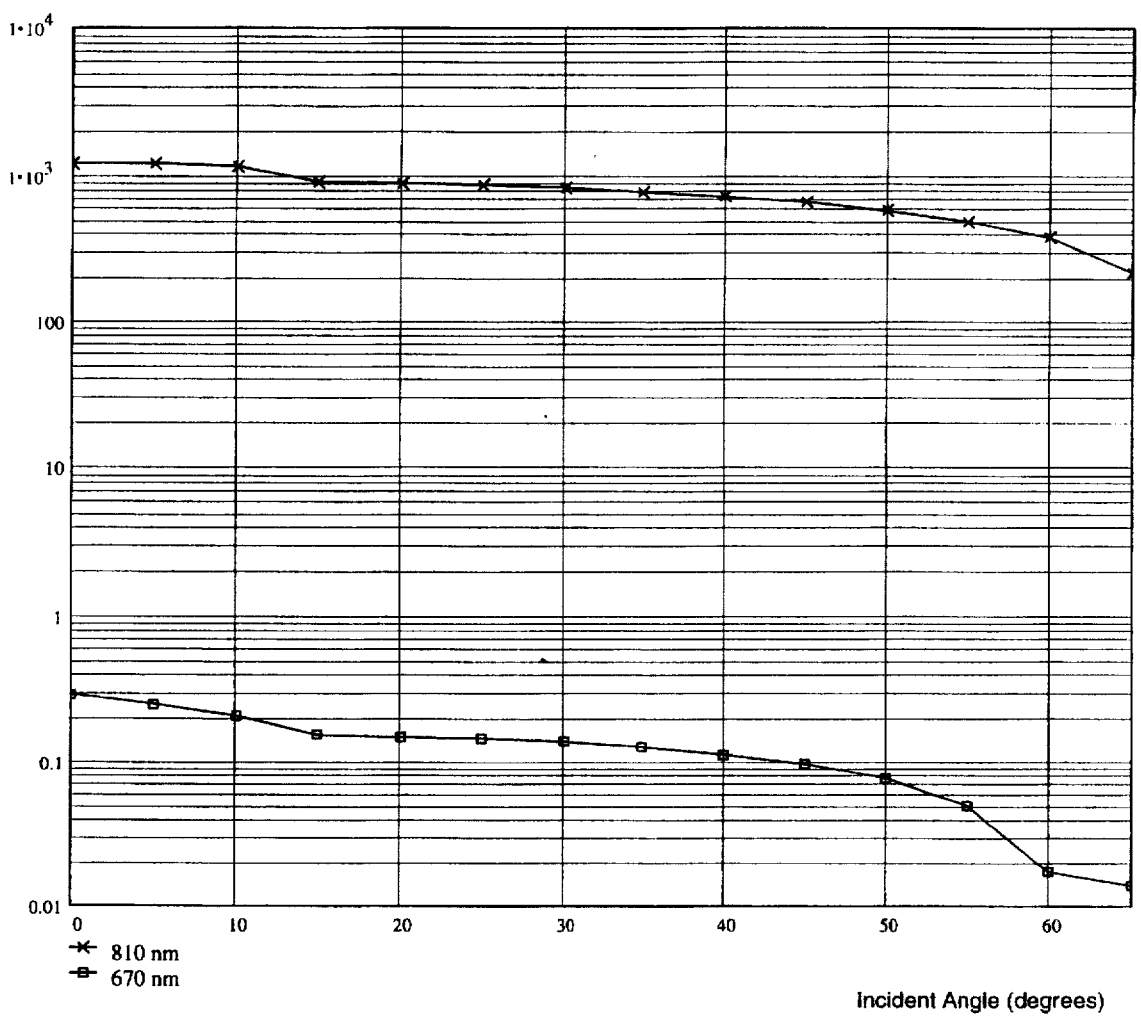
FIG. 2 is a graph plotting retroreflector luminance gain versus incident angle at two different wavelengths according to one embodiment of the invention.

Now making reference to FIG. 1, there is depicted instrumentation according to the invention which may be used, for example, in a laser search and rescue application. Such instrumentation preferably includes a scan-head chassis 102, an electronic chassis 104, a laser pulse driver 106 and laser cooler 108. The pulse driver 106 and laser cooler 108 may be purchased from commercial suppliers. In this particular embodiment, the scan-head chassis 102 may be mounted on the wing strut of an aircraft, with the understanding that other craft or vehicle locations may be used, depending upon the implementation of the invention. Broadly, the primary purpose of scan-head chassis 102 is to transmit the laser energy toward a target-containing area, scan the area with the laser beam, and collect the return energy. Various known scanning architectures may be used according to the invention, including flying spot, whiskbroom, pushbroom, and area imaging, though, in a preferred embodiment, a whiskbroom approach is used with a narrow field of view.

The received optical energy is transformed into electrical signals and sent to the electronic chassis 104 for real-time target detection, recording and other functions.

This particular implementation of the invention will be described with reference to the multiple-wavelength embodiment of the invention. Accordingly, there are at least two independent pulsed laser diode sources 110 and 112 in the instrument. The wavelength separation between the two sources is preferably relatively small to increase the likelihood that both reflect from a glint object with comparable amplitudes, enabling both to be detected with the same photodetector material. As high power, pulsed, laser diodes presently have four available wavelength ranges: 670 nm (red), 800–820 nm (near-IR), 940–960 nm (near-IR), and 970 nm, two of these wavelengths were used in the examples which follow, though it will be apparent that the invention is not limited in terms of the wavelengths used.

The lasers are preferably simultaneously pulsed for several hundred microseconds using the pulsed laser driver module 106. The output of the lasers are collimated to a narrow divergence angle through beam conditioning optics 114 and 116, and combined using a dichroic beam combiner 120. The combined beam is then conditioned by transmit optics 122. From there the combined beam is reflected from a scanning galvanometer mirror 124 to illuminate a target area. At any given instant, the beam profile on the ground is approximately 140 feet in diameter (2° cone angle projected from a 4,000 AGL altitude). The galvanometer mirror 124 sweeps the beam in 40 discrete steps to obtain an 80° total field of view.

The receiver field of view is similar to that of the transmitter, that is, a 2° cone angle at any given instant. The receiver is coaligned with the transmitter and is also swept across the ground by the galvanometer mirror 124. The reflected energy from both wavelengths is captured by collection optics 130, then spectrally separated using a dichroic beam splitter 132. Narrowband optical filters 134 and 136 are placed in front of CCD cameras 138 and 140 associated with each wavelength. These filters are approximately 10 nm wide, permitting most of the laser energy to reach the cameras while greatly reducing solar-based energy which may degrade target detection. As an alternative technique a dual passband optical filter may be positioned before the collection optics, and use a dichroic beam splitter. The cameras are similar to those used in consumer camcorders, but are of scientific grade and have a variable integration time and digital outputs. The CCD arrays in each camera dissect the 2° field of view into several thousand elements, which minimizes the solar contributions and noise terms, both of which can corrupt the target detection process.

The digital outputs of the two CCD cameras 138 and 140 are sent to the electronic chassis 104 for real-time target detection and recording. The primary purpose of the chassis 104 is to control the operation of the scan head to process the imagery and to record the imagery for archival and/or test purposes. The scan-head synchronization module 144 is used to coordinate the position of the galvanometer scan mirror 124 with the laser pulses and the CCD camera image acquisition. The purpose of the frame grabber module 142 is to acquire the image from both digital cameras and pass the raw imagery to the electronic chassis. The data recorder 160 may be used to record all of the raw imagery from the system for archival/test purposes. In a preferred embodiment, the chassis 104 also contains a position fixing system such as a global positioning system (GPS) including receiver 150 and antenna 152 to help geo-locate the detected targets. Differential GPS (DGPS) may be used to provide about 5 meter accuracy as compared to 100 meter accuracy for standard C/A code GPS.

Host computer and real-time target processor 170 in chassis 104 is preferably a single-board computer, which passes commands and status information from an operator interface 174 to provide high-level control of the system.

This high level control includes initiating scanning or storing image acquisition, communications with the GPS receiver 150, formatting the data for recording, and controlling the data recorder 160. In operation, signal processing and discrimination electronics connected to each photodetector are used to generate a valid target signal when the optical energy reflected by the target at each laser frequency pass a discrimination algorithm. The invention is not limited to a particular form of algorithm, and various suitable alternatives may be used, including comparisons with pre-determined thresholds, and comparisons between the returns themselves at difference frequencies. In a preferred implementation, a first stage of signal processing involves amplitude discrimination, which will accept (as potential targets) those pixels in which a signal is greater than a particular threshold value, for example, an order of magnitude greater than that typical of a strong diffuse reflector. Upon acceptance, a second stage of signal processing is used to analyze the signal strength at the second wavelength and, upon further acceptance, the values of $\lambda_1$ and $\lambda_2$ may be compared to one another, preferably by finding their ratio, though other types of comparisons may be used, including differencing, and so forth.

The implementation of the amplitude and ratio thresholding is quite straightforward, and may be accomplished using a look-up table implemented using ROM, RAM, or a digital signal processor. Automatic variable amplitude and ratio thresholds may also be implemented; that is, without operator intervention. These would be based upon variables such as solar illumination, background (vegetation, snow), and high altitude atmospheric transmission (haze, clouds), and low altitude atmospheric transmission (fog).

In conjunction with the signal analysis system just described, the invention utilizes specially prepared reflective markers, preferably based upon retroreflector technology. Both sheet-type marker materials as well as volumetric retroreflectors may be used, though the sheet materials are preferably used on aircraft, watercraft, life rafts, and so forth due to the availability of surface area and potential need for an aerodynamic profile. Preferred materials exhibit luminance gains of 1000–2000, while being capable of operating over a ±45° field of view with suitable return intensities. In an aircraft application, one square foot of suitable material may be applied within a 2×2 foot area, and may be configured as stripes, numbers, letters, decorative emblems, squares, circles, etc.

For use on individuals, life preservers, and smaller targets, a volumetric retroreflector is preferably used as these typically provide higher luminance gain for a smaller surface area. Existing technologies may be used, including "corner cubes" and cat's-eye beads. Corner cube technology uses a reflective technique wherein three highly reflective surfaces are mounted at precisely 90° angles (forming a corner) to reflect the incident light back out and toward its source. These cubes, which have a diameter of about ½ centimeter, may be attached to a flotation device for watercraft, placed on the ground, or may be hand-held by an individual.

Although commercially available retroreflective materials or elements may serve as a base target marking material, these elements are specially prepared according to the invention so that they exhibit unique spectral properties for discrimination against other natural and made-made objects. In the case of the multiple wavelength embodiment of the invention, the base retroreflective element, whether in sheet or volumetric form, is chosen to reflect laser energy at a first wavelength, but is also prepared to affect an optical property separate from the reflection at the first wavelength.

In one embodiment of the invention, the underlying retroreflector is adapted to attenuate laser energy at a second wavelength. Preferably, this is accomplished by applying a dye to the photoreflector surface which strongly rejects the secondary wavelength, enabling the signal processing circuitry described above to detect a strong imbalance in the amplitude of the two wavelengths to declare a valid target. In the case of sheet retroreflector, such materials typically include a protective polymer layer which is conducive to be doped with a dye to provide the spectrally sensitive coating. In the case of a volumetric retroreflector, it may be separately coated with a layer of suitable polymeric material which, in turn, may be doped with a dye tailored to reject the second wavelength. Alternative wavelength discriminating materials may also be used according to the invention, including a dielectric stack.

In an alternative embodiment of the invention, polarization may be used to differentiate target materials from both diffuse and glint reflections. As depicted in block diagram form in FIG. 3, the optical system in this case preferably transmits elliptically polarized light having an X rotation to the target-containing space, with the receiver including collection optics 310 and filtering means 312 which reject elliptically polarized light having a Y rotation. Since diffuse features will reflect light of multiple polarizations in accordance with the composition and orientation of such features, the strength of the reflected signal in this case will be weak. Additionally, as glint features will necessarily have a surface orientation that is nearly normal (at or near 90°) to the angle of incidence, the reflected light will continue to be elliptically polarized, but its rotation will be reversed into the Y rotation, which will then be rejected by the imaging system's filter 312. The marker according to this embodiment is therefore intended to reflect the elliptically polarized light in the X rotation directly; that is, without a change in rotation, resulting in a strong return signal as compared to diffuse features and rejected light having a Y rotation. Although the following example is based upon the handedness of circularly polarized light, the extension to the general case of elliptical polarization as discussed above should be apparent to one of skill in the art.

Figure 3:
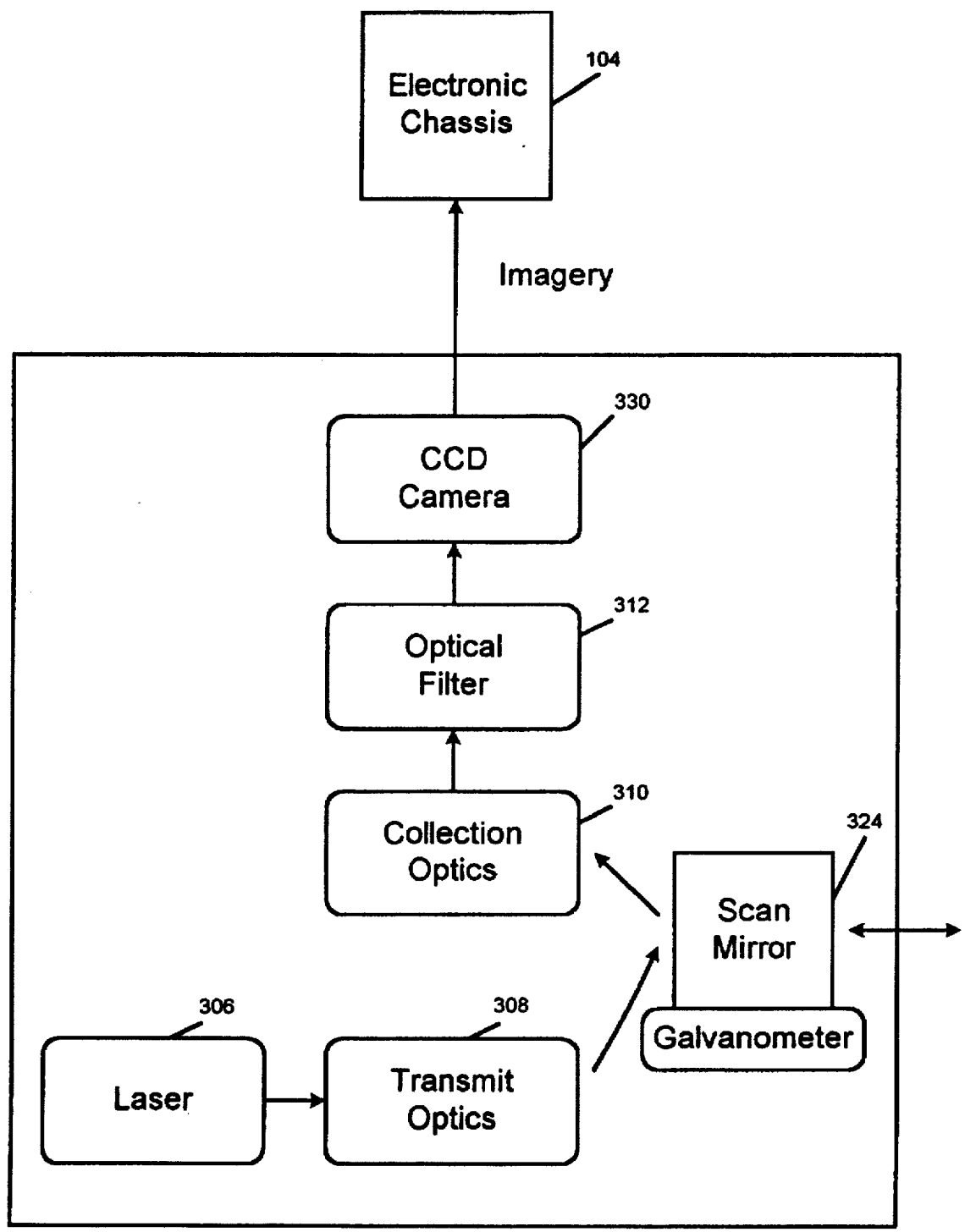
FIG. 3 is a block diagram of instrumentation according to an alternative embodiment of the invention which discriminates, in part, using a change in polarization.

Continuing the reference to FIG. 3, many subsystems of this embodiment may be common to those introduced with respect to the multiple-wavelength aspects of the invention according to FIG. 1, including the entire electronic chassis 104 receiving imagery from a modified scan-head chassis 302. The optional pulse driver and cooler for the laser 306 may also be the same, and are therefore not shown in this figure. The scan mirror and galvanometer combination 324 may also be similar or identical to that shown and described with respect to FIG. 1.

Assuming the laser 306 emits linearly polarized light, the transmit optics 308 in this case include components which convert the linear polarized light into right circularly polarized light using, for example, a quarter-wave plate. This right circular light then travels from the instrument and can be reflected by glint, diffuse and target features. As discussed above, the glint features will reverse this rotation, and will be reflected back as left circularly polarized radiation, whereas diffuse objects will produce weak reflections typically including a plurality of polarization orientations.

A suitable target according to this embodiment of the invention preferably reflects numerous polarization states when illuminated by right circularly polarized light. For example, this effect may be realized through the use of an anisotropic film whose polarization orientation and depth vary over the extent of the target in such a way that the reflected light produces many polarization states. Subsequent to collection optics 310, however, the optical filter 312 will include means which only pass right circularly polarized light. For example, a quarter-wave plate and linear polarizer with proper orientation may be utilized for this purpose, thereby effectively blocking glint reflections from being received by the CCD camera 330. Although some portion of the diffuse light may be passed by the filter 312 and form a weak signal on the camera 330, approximately half of the valid target light will pass through the filter to form a strong signal indicating a valid detection. Within the electronic chassis 104, the weak diffuse and strong target signals may then be magnitude differentiated and analyzed to reduce false returns.

In addition to the optical manipulation techniques just described, multiple "looks" may also be used to provide further increase in probability of detection, reduction in false alarms, and glint rejection. The basic principle is that glint return comes only from a very precise co-alignment of source, reflector, and receiver. As such, multiple looks at the same target from different angles raise the confidence that the same glint would not be present in two images from significantly different angles. The false target would then be eliminated by co-registration and signal processing.

EXAMPLE

Figure 4A:
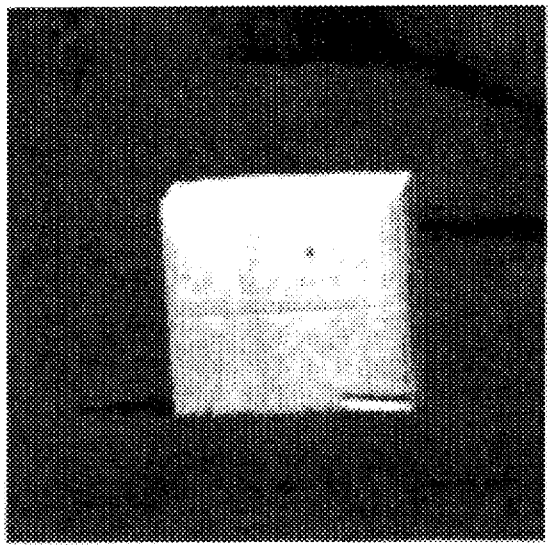
FIG. 4A is a panchromatic image associated with the detectability of a marker material according to the invention.
Figure 4B:
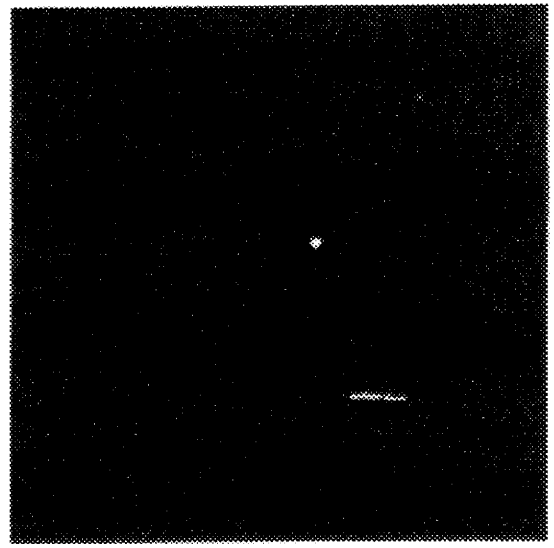
FIG. 4B is an image obtained of the marker of FIG. 4A using an 810 nm spectral filter.
Figure 4C:
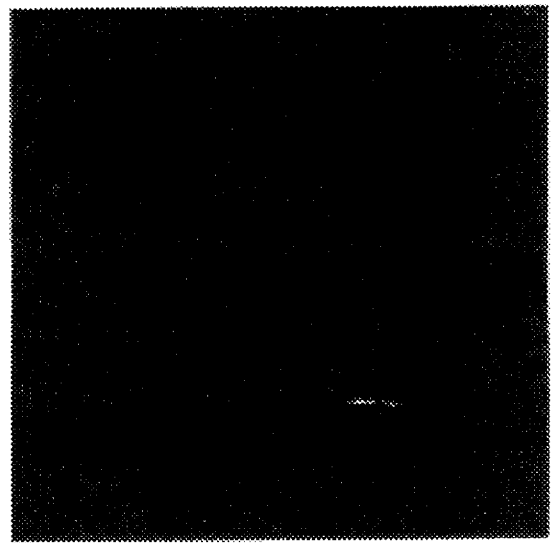
FIG. 4C is an image of the marker of FIG. 4A using an 670 nm spectral filter.

An outdoor demonstration was performed to verify the detectability of the marker material with retroreflective, natural, man-made, and glint objects. The imagery from these tests are shown in FIGS. 4A, 4B, and 4C. Each image is collected with the same sensor looking at the same targets. All images have 256×256 pixel resolution and a 2° field of view which projects to 3.5 feet at the target distance of 100 feet. Within each image are:

A white box used to simulate a highly reflective diffuse background such as snow;

A small (0.6") retroreflector target (visible as the dark dot in the upper right quadrant of the white box in the first image) (4A); and A shiny tin can, chosen to provide a specular (mirror-like) return. This can is located near the lower right corner of the box.

FIG. 4A is an image acquired with solar illumination only and is similar to what is visible to the human eye. The next two figures contain images that have the scene illuminated with solar illumination and two lasers: one at 810 nm and the other at 670 nm. In FIG. 4B, a 810 nm spectral filter is used to pass only 810±5 nm energy to the CCD camera. The resulting image was contrast and brightness adjusted, setting the very bright objects to white, while all others go to black. Note that the vegetation background, and the white box are now black and that we have strong returns from the retroreflector and the tin can, which are now white.

In FIG. 4C, a spectral filter is used to pass only 670±5 nm energy to the CCD camera. This image was also contrast and brightness adjusted. Note that this image is similar to the 810 nm image, but that the retroreflector no longer appears due to the absorbing spectral coating on the retroreflector which absorbs the 670 nm laser light. With the signal processing algorithm tailored to detect objects which have both a strong return in the 810 nm image and a weak return in the 670-nm image, it is clear that the only object that will meet this target detection criteria is the spectrally coated retroreflector marker.

That being claimed is:

1. In a target detection system of the type wherein the amplitude of a reflected laser beam having a primary wavelength is measured to determine the presence of a marker, the improvement comprising the steps of:

transmitting, to a target-containing area, a laser beam having a predetermined supplemental optical attribute;

analyzing the marker's effect on the supplemental optical attribute in addition to performing a measurement at the primary wavelength; and declaring a detected target as valid only if the analysis indicates that the supplemental optical attribute has also been substantially altered by the marker.

2. The target detection system of claim 1, wherein the supplemental optical attribute includes amplitude at a non-primary laser wavelength.

3. The target detection system of claim 1, wherein the supplemental optical attribute includes the polarization orientation.

4. A target detection method, comprising the steps of:

emitting optical radiation from a source having energy at a first wavelength plus a supplemental optical attribute;

providing a marker on a target which reflects the optical radiation at the first wavelength back toward the source while affecting the supplemental optical attribute;

analyzing the reflected radiation, and declaring the presence of the target only if a sufficient amount of energy at the first wavelength is present along with evidence that the supplemental optical attribute was also substantially affected by the marker.

5. The method of claim 4, wherein the supplemental optical attribute is amplitude at a second wavelength.

6. The method of claim 5, wherein the amplitude is attenuated by the marker.

7. The method of claim 4, wherein the supplemental optical attribute includes polarization orientation.

8. A target detection system, comprising:

a source of optical radiation having energy at a first wavelength plus a supplemental optical attribute;

a marker adapted for placement on a target to be detected, the marker being characterized in that it reflects energy at the first wavelength back toward the source while affecting the supplemental optical attribute; and detection apparatus for analyzing radiation received from the marker, including means for declaring the presence of the target only if a sufficient amount of energy is detected at the first wavelength along with evidence that the supplemental optical attribute was also substantially affected by the marker.

9. The target detection system of claim 8, wherein:

the supplemental optical attribute includes energy at a second wavelength, and wherein:

the detection apparatus includes means for analyzing radiation received from the marker at the second wavelength, the presence of the target being declared only if a sufficient amount of energy is detected at the first wavelength along with evidence that energy at the second wavelength was substantially attenuated by the marker.

10. The target detection system of claim 8, wherein:

the supplemental optical attribute includes polarization of the energy at the first wavelength, and wherein:

the detection apparatus includes means for analyzing the polarization of the radiation received from the marker, the presence of the target being declared only if a sufficient amount of energy is detected at the first wavelength along with evidence that the marker also substantially affected the polarization of the energy.

11. A search and rescue system, comprising:

a plurality of lasers, each operating at a different frequency;

a combiner to merge the outputs of the lasers into a common search beam;

means for directing the search beam into a target-containing area;

collection optics to gather optical energy reflected by the target;

means to separate the optical energy reflected by the target into a plurality of outputs associated with each laser frequency;

a plurality of photodetectors, each receiving one of the outputs associated with each laser frequency and producing an electrical signal representative thereof; and signal processing and discrimination electronics connected to the optoelectric sensors, such electronics being operative to generate a valid target signal when the optical energy reflected by the target at each laser frequency meets predetermined criteria in accordance with a discrimination algorithm.

12. The search and rescue system of claim 11, the predetermined criteria being:

(a) that energy returned by the target at one laser frequency is abundant, and (b) that the energy returned at a different laser frequency is highly attenuated.

13. The search and rescue system of claim 11, including a pulsed laser.

14. The search and rescue system of claim 11, further including a geo-location fixing system (GPS) receiver, enabling the target to be geo-located when the criteria are met.

15. The search and rescue system of claim 11, wherein the means for directing the search beam into a target-containing area includes means for scanning the target-containing area with the search beam.

16. The search and rescue system of claim 11, further including:

a marker supported on the target to be located, the marker being characterized in that it reflects laser energies present in the search beam differently as a function of wavelength.

17. The search and rescue system of claim 11, the marker further including:

a retroreflector operative to redirect laser energy received at a first wavelength back to the source of such energy; and means for absorbing laser energy at a second wavelength.

18. The search and rescue system of claim 17, wherein the means for absorbing laser energy at a second wavelength includes a dye associated with the retroreflector.

19. In a search and rescue environment, a marker adapted for placement on a target to be located, the marker comprising:

means for receiving optical radiation from a search and rescue system having a primary wavelength and a supplement optical attribute, and reflecting the radiation at the primary wavelength back to the search and rescue system with the supplemental optical attribute being substantially altered.

20. The marker of claim 19, wherein the supplemental optical attribute is enter at a wavelength different from that of the primary wavelength.

21. The marker of claim 19, wherein the alteration includes attenuation of the energy at a non-primary wavelength.

22. The marker of claim 19, wherein the supplemental optical attribute includes polarization orientation.

* * * * *